United States Patent
Williams et al.

[11] Patent Number: 5,610,977
[45] Date of Patent: Mar. 11, 1997

[54] NUMBER PORTABILITY USING ISUP MESSAGE OPTION

[75] Inventors: L. Lloyd Williams; R. William Carkner, both of Kanata, Canada

[73] Assignee: Stentor Resource Centre, Inc., Canada

[21] Appl. No.: 579,305

[22] Filed: Dec. 27, 1995

[30] Foreign Application Priority Data

Dec. 21, 1995 [CA] Canada .................................. 2165857

[51] Int. Cl.⁶ ............................. H04M 3/42; H04M 7/00; H04J 3/12
[52] U.S. Cl. ........................ 379/207; 379/211; 379/220; 379/230; 370/385
[58] Field of Search ................................. 370/60.1, 94.1, 370/110.1; 379/201, 207, 211, 219, 220, 221, 222, 224, 229, 230

[56] References Cited

U.S. PATENT DOCUMENTS

| | | | |
|---|---|---|---|
| 4,313,035 | 1/1982 | Jordan et al. | 379/230 X |
| 4,754,479 | 6/1988 | Bicknell et al. | 379/221 X |
| 5,255,315 | 10/1993 | Bushnell | 379/230 X |
| 5,377,186 | 12/1994 | Wegner et al. | 379/230 X |
| 5,422,941 | 6/1995 | Hasenauer et al. | 379/207 |

OTHER PUBLICATIONS

"A Location Routing Number for Number Portability", R.B. Hirsch, Dec. 15, 1994.
"Elaboration of Split Number Space Implementation for Portability", Stratus Computers Inc., Mar. 1, 1995.

Primary Examiner—Krista M. Zele
Assistant Examiner—Harry S. Hong
Attorney, Agent, or Firm—Cobrin Gittes & Samuel

[57] ABSTRACT

A method of providing number portability for the treatment of calls from a calling party to a specific number of a called party is disclosed. An Initial Address Message (IAM) containing the calling and called party's numbers to enable said call to reach said terminating office is forwarded from an originating office to a terminating office. Once the IAM is received at the terminating office, a determination of whether the call is directed to a portable number is made. If the call is directed to a portable number, a release message containing an indication that the called party number is, a portable number and containing new routing information is forwarded from the terminating office to the originating office. A new IAM is then sent from the originating office to a terminating office associated with the routing information.

13 Claims, 4 Drawing Sheets

NUMBER PORTABILITY USING ISUP MESSAGE OPTION

SUMMARY OF THE INVENTION

This invention relates to telephone networks, but more particularly, to a method and system for providing number portability using an ISUP message option.

BACKGROUND OF THE INVENTION

Although efforts are being made to solve some of today's network transparency constraints, the solutions offered are still constrained by the rigid rules of today's North American Numbering Plan (NANP) and the architecture which supports it. That is, each telephone subscriber has a number in the NXX-NXX-XXXX format, where N represents a digit from 2–9 and X represents a digit from 0–9. The first group of three digits indicates the area code or NPA of the subscriber, the second group of three digits indicates a switching exchange or service switching point to which the subscriber is connected, and the last four digits indicate the address of the subscriber within the service switching point. Digits 0 and 1 are of course not available as the first digit (N) to allow operator and long distance services.

With the large increase in telephone devices of one sort or another, an equivalent increase in the demand of telephone numbers has been created. For example, 15 years ago, most telephone numbers were used for fixed Plain Ordinary Telephone Service (POTS) devices. Today, more and more users make use of several devices, such as cellular telephones, pagers, fax machines, modems, etc. This demand has placed a large impact on the pool of numbers available for customers. In some instances, metropolitan areas that used to be served by one area code, now require several. The problem is, of course, compounded by the need to assign new telephone numbers to subscribers who move from one region to another. In addition, numbers must, in future, be portable between networks, namely between the Incumbent Local Exchange Carriers (ILEC) and Competitive Local Exchange Carriers (CLEC).

To help reduce this need for new numbers, network facilitators have been unsuccessfully researching options for delivering a service in which telephone numbers are not tied to equipment locations.

New telephone networks with Advanced Intelligent Network (AIN) concepts have been proposed to support faster development of new services through a network architecture in which network functions and interfaces are standardized providing greater independence between service software and technology.

One service application which makes use of AIN technology for separating dialling from physical routing is Local Number Portability (LNP). The applications are being examined by the Information Industry Liaison Committee (IILC) for extension of LNP concepts. Many options have been discussed and are being investigated. The options to route based on network number ownership fall short, in the sense that they impose various limitations, and are at this time unworkable.

The current direction for network evolution is to remove intelligence from the telephone exchange using database query procedures to increase network flexibility. Where initial decisions can be made for launching a query to a database, increased flexibility can be easily obtained, usually with reduced costs. However, the costs increase dramatically when all calls from a specific exchange require this procedure. Costs associated with the database query implementation include:

- AIN and/or vendor license charges (usually on a per dip basis),
- Increase in exchange CPU requirements (factor of 2–5 per call),
- Augment of the signalling network,
- Database infrastructure required to support queries, and
- Database updates to keep all systems current.

Number portability requires the treatment of all calls to a specific number irrespective of the point of origin, making the terminating switch the most logical location to control the call. Initially, this concept presents an inexpensive option for allowing portability, but as the numbers increase many additional circuits will be required. At this point release link trunks can be employed to reduce the connect ions, but this requires a common protocol and significant interconnection development.

Most solutions carry significant development requirements and it is therefore important to choose the option which can support the requirements over the long term.

Two options are the most widely recognized and popular at present. The first is to use AIN technology to use a query and response procedure for each call to query a database to establish number ownership. The second option is that of Terminating Switch Routing. This proposal consists of the routing of calls using the existing NANP to the expected terminating switch location where, when numbers are owned by another network, calls are then route advanced to that network. In some cases, release link trunks are envisioned to reduce the number of circuits required.

Some problems still exist in implementing these proposed methods, including flash cuts, calls being routed several times between networks and inefficient routing schemes. In addition, the solutions proposed above, are meant to make use of AIN technology. Although AIN is considered a subset of Intelligent Networks (IN), number portability should not be limited to AIN networks only.

A need therefore exists for providing a mechanism to take advantage of these various methods while providing the flexibility to eliminate single option constraints.

It is therefore an object of the present invention to provide number portability which overcomes the aforementioned problems.

Another object of the present invention is to provide a method of routing calls between networks with ported numbers while making use of existing facilities, minimizing call routing complexities and costs.

Another object of the present invention is to provide a method of routing calls to provide number portability, which makes, use of the flexibility provided by ISUP signalling.

Another object of the present invention is to provide number portability by modifying ISUP signalling messages to enable the modified message to provide a new routing option for calls which are directed to directory numbers determined to be portable.

Yet another object of the present invention is to provide a method of providing number portability by modifying the ISUP message transmitted from the terminating switch, to provide an indication to the originating switch that the directory number is determined to be portable.

Yet another object of the present invention is to provide a method of providing number portability by modifying an ISUP message parameter capable of carrying routing information such that a new routing option can be forwarded from the terminating switch back to the originating switch for completing the call.

Yet another object of the present invention is to provide number portability for calls originating from network switching nodes unable to support number portability.

In accordance with a first aspect of the present invention, there is provided, in a telephone network having a number of telephone switching offices equipped with SSPs (Service Switching Points) operating with IN (Intelligent Network) application software, and a remotely located SCP (Service Control Point adapted to receive, when required, SS7 (Signalling System 7) messages from the SSPs to translate a dialled number to enable the routing of a call on the telephone network, a method of providing number portability for the treatment of calls from a calling party to a specific number of a called party, comprising the steps of:

a) receiving digits dialled by said calling party at an exchange serving said calling party;

b) establishing a call path from said exchange serving said calling party to a terminating exchange associated with the dialled digits;

c) receiving an Initial Address Message (IAM) at said terminating exchange and determining whether said call is directed to a portable number;

d) creating at said terminating office, a first modified ISUP message containing an indication that the called party number is a portable number, if said call is directed to a portable number;

e) launching a query to a database, if said call is directed to a portable number to obtain a routing option to enable said call to be routed to said called party;

f) using said routing option at said terminating office for creating a second modified ISUP message containing said routing option;

g) determining whether a previous switching office along the signalling path is capable of supporting number portability;

h) sending said first and second modified ISUP messages from said terminating office to said previous switching office along said signalling path, if said previous switching office is able to service the call;

i) receiving said routing option at said previous switching office; and j) creating a new IAM to enable the call to reach the called party.

In accordance with another aspect of the present invention, there is provided, in a telephone network having a number of telephone switching offices equipped with SSPs (Service Switching Points) operating with IN (Intelligent Network) application software, and a remotely located SCP (Service Control Point) adapted to receive, when required, SS7 (Signalling System 7) messages from the SSPs to translate a dialled number to enable the routing of a call on the telephone network, a system for providing number portability for the treatment of calls from a calling party to a specific number of a called party comprising:

a) a first switching office for receiving digits dialled by said calling;

b) a second switching office connected to said first switching office via a signalling path established for routing a call associated with the dialled digits, said second switching office receiving an Initial Address Message (IAM);

c) first database means, at said second switching office for determining whether said call is directed to a portable number;

d) means at said second switching office for creating a first modified ISUP message containing an indication that the called party number is a portable number, if said call is directed to a portable number;

e) second database means at said second switching office for determining whether a previous switching office along the signalling path is capable of supporting number portability, wherein said first modified ISUP message is sent from said second switching office to said previous switching office along said signalling path, if said previous switching office is able to service the call;

f) third database means for receiving a query from said second switching office if said first modified ISUP message contains an indication that said called party number is a portable number, and for translating said called party number to new routing information, said second switching office creating a second modified ISUP message which contains said new routing information, such that when said new routing-information is received at a previous switching office, a new IAM can be forwarded to a terminating office associated with said new routing information.

BRIEF DESCRIPTION OF THE DRAWINGS

In order to impart full understanding of the manner in which this object and others are attained in accordance with the present invention, preferred embodiments thereof will be described hereinafter with reference to the accompanying drawings wherein.

In the following description and the drawings, the same reference numerals will refer to the same structural elements.

DESCRIPTION OF THE PREFERRED EMBODIMENTS

In order to lighten the following description, the following acronyms will be used:
ACM: Address Complete Message;
AIN: Advanced Intelligent Network;
ANM: Answer Message;
CCS7: SS7 network signalling;
GAP: Generic Address Parameter;
IAM: Initial Address Message;
IN: Intelligent Network;
ISDN: Integrated Services Digital Network;
ISUP: ISDN User Part;
POTS: Plain Ordinary Telephone System;
PSTN: Public Switching Telephone Network;
REL: Release Message;
RLC: Release Complete;
SCP: Signalling Control Point;

SSP: Service Switching Point;
STP: Signalling Transfer Point;
SUS: Suspend Message;
TCAP: Transaction Capabilities Application Part.

As indicated above, AIN is considered a subset of IN. However, for the purpose of the present invention, IN will be used hereinafter, even though the solutions offered here are applicable to AIN as well.

A typical SS7 network consists of signalling links and nodes. SS7 nodes are referred to as signalling points (SP) and are interconnected by signalling links. Each SS7 signalling node is assigned a unique point code, serving as the network address for message routing. SS7 signalling nodes include signalling Points (SP), service switching points (SSP), service control points (SCP) and signal transfer points (STP).

Signalling points (SP) are capable of sending and receiving SS7 messages with other SS7-equipped telephone offices, and routing calls based on the information exchanged. Incoming messages are formatted and transferred to the relevant processing function in the switch. Outgoing messages are transmitted over the signalling links.

Service switching points (SSPs) are signalling points (Sps) further equipped to halt call progress, launch an SS7 query to obtain additional routing information from an SCP, and then route or treat the call based on the information received in the SCP's response. SSPs interact with databases to provide services and routing.

Service control points (SCP) are often referred to as SS7 services databases. One or more SCPs can serve as a central intelligence point in the network for determining how and if calls are to be routed through the network. Queries and responses to and from the SCP are carried over SS7 signalling links in the form of packet messages.

Signal transfer points (STP), are special SS7 nodes which provide a message switching function between other nodes and a SS7 network. Acting as a packet switch, it examines incoming messages and then routes them over the appropriate signalling link to the proper destination switching offices and databases. In this particular function, it supports end-to-end signalling, i.e. in transit (local, tandem and toll) connections, required for transaction messaging used for special services. Unlike other SS7 nodes, the STP does not generally act as a source or sink for SS7 messages.

Figure 1:
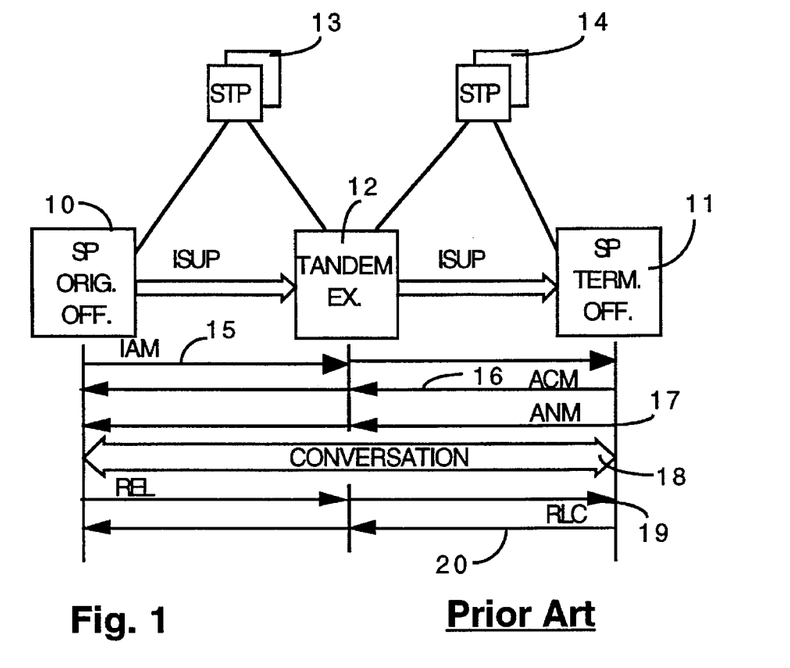
FIG. 1 is a diagram illustrating generally the basic signalling call flow between an originating and a terminating office.

Referring now to FIG. 1, we have shown a flow diagram which is used for providing an understanding of ISUP (Integrated Services Digital Network (ISDN) User Part) call progression. Signalling Transfer Points (STPs) have been shown but are usually transparent to ISUP signalling.

The message purposes are defined as follows:
IAM: Initial Address Message: Indicates a request to each subsequent exchange for call set-up and to reserve the indicated trunk. Call connection will not be completed until the status is returned indicating the call path has been confirmed and the dialled number exists and is idle. The IAM contains information about both the calling and called parties.
ACM: Address Complete Message: Indicates to the originating exchange that the call path has been confirmed and the dialled address exists and is idle.
ANM: Answer Message: Returned by the terminating exchange once the call has been answered. Both directions of the call path are established at this time.
REL: Release Message: Sent by the originating office to indicate that the originating party has terminated the call.
RLC: Release Complete: Indication from the terminating exchange that the release message has been received and all connections have been terminated. The RLC can be considered as an acknowledgement of a REL message and the circuit being taken down.
SUS: Suspend Message: Sent by the terminating exchange where the called party terminates a completed call prior to the calling party going on-hook. The terminating office sends a REL message when it has not been able to set up to the called party. SUS messages are supported in the TR317 Bell Core protocol, but not supported in most SS7 ISUP signalling standards. REL messages are used in those cases.

In the call scenario of FIG. 1, the call flow illustrates signalling which takes place during the call set-up and take-down of the call between originating office 10 and terminating office 11, via tandem exchange or intermediate office 12. After the calling party has picked up the receiver and received a dial tone, dialled digits are received at the originating switch 10. The first message sent during ISUP signalling call set up is an Initial Address Message 15 (IAM), which is created and sent from an originating office 10 to a tandem exchange 12 and re-created at tandem exchange 12 and forwarded to terminating office 11. The STP pairs 13 and 14, as indicated above, have been shown but are usually transparent to ISUP signalling. The IAM message 15 passes information about the call to all subsequent offices in path. The IAM reserves a voice path while verifying the availability of the destination station, at the far end, i.e. terminating office 11. An Address Complete Message (ACM) 16 then sends confirmation that the dialled address both exists and is idle. Where the far end is available, a call path is established. Once the called party answers, an answer message (ANM) 17 is then returned to the originating office 10 and the conversation 18 then begins.

Call termination can be initiated from either the originating office 10 or the terminating office 11. Most ISUP protocols make use of release messages in either direction, for example, REL message 19 of FIG. 1. A release complete message (RLC) 20 is then returned, in this case, from the terminating office 11 to the originating office 10, indicating that all circuits have been returned to the available resource pool.

Figure 2:
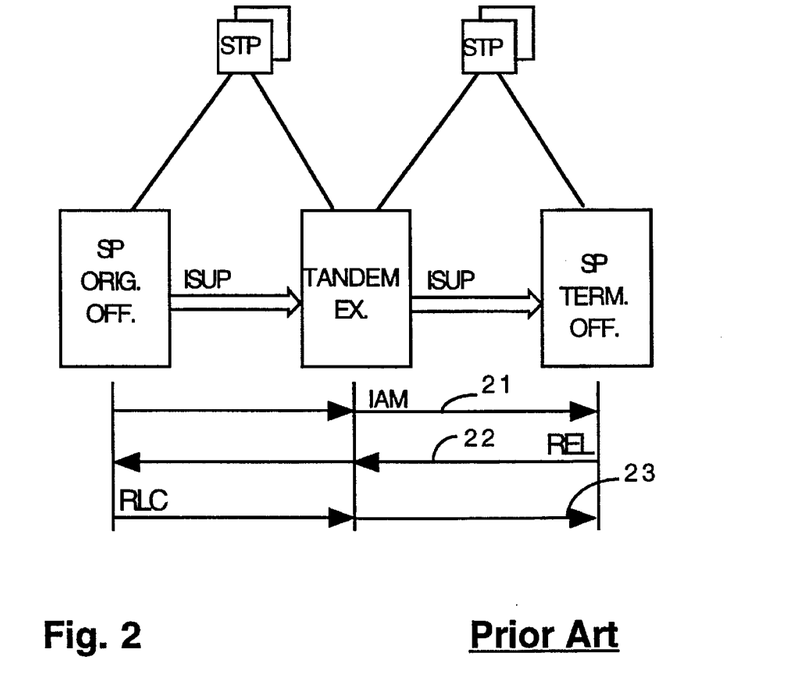
FIG. 2 is a diagram illustrating generally the basic signalling call flow between an originating and a terminating office when the destination station is not available.

Although ISUP protocols make use of release messages in either direction, Bell Core's TR 317 protocol requires that a Suspend message (SUS) be sent when the terminating party hangs-up first.

Where the call is not answered, the sequence of messages changes following the IAM. This is illustrated in the flow diagram of FIG. 2. Again, the first message sent during the ISUP signalling call set up is the Initial Address Message 21. However, instead of returning the ACM, such as in FIG. 1, when the IAM 21 is received at the terminating office, a release with cause message 22 is sent back to the originating office, followed by the release complete (RLC) message 23. Ordinarily, this message indicates the termination of the call and gives direction to apply the appropriate treatment. Examples of this treatment are busy, vacant code, unallocated number, etc.

Figure 3A:
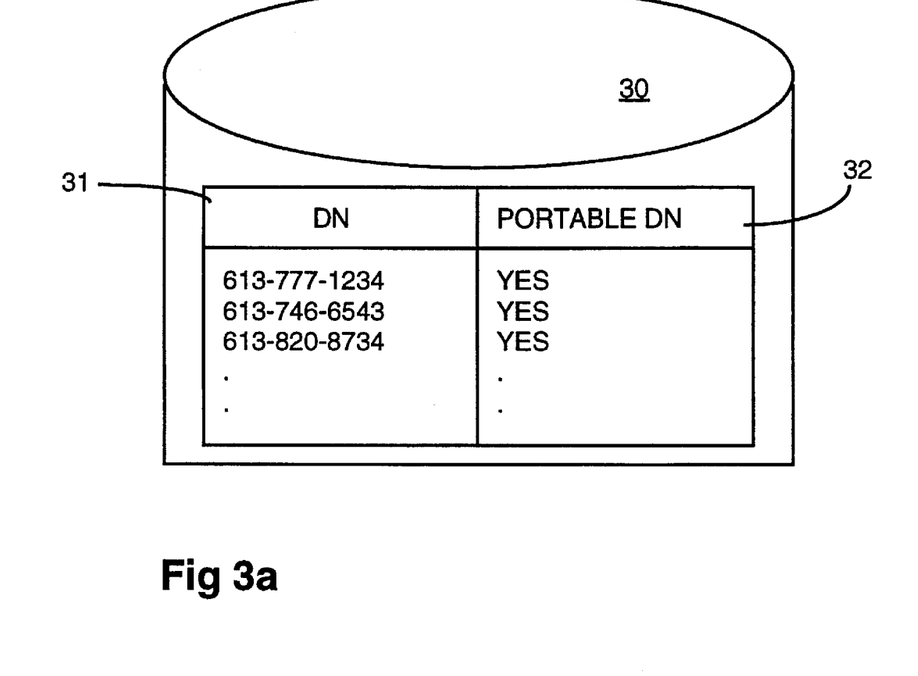
FIGS. 3a and 3b are diagrams illustrating updated directory tables for use with the preferred embodiment of the present invention.
Figure 3B:
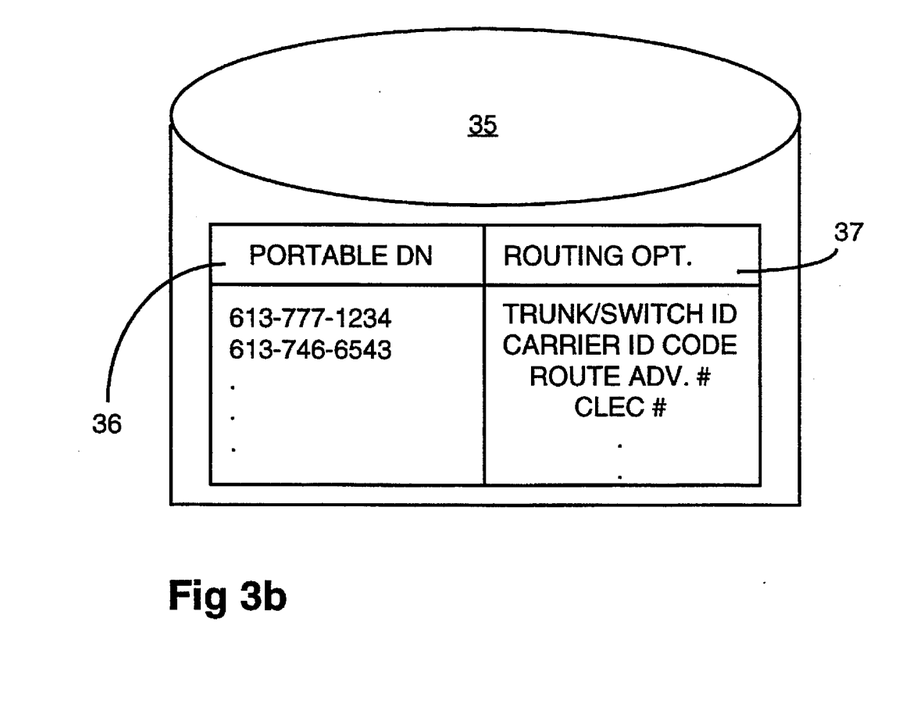

As indicated above, portable numbers are anticipated to be numbers currently assigned to a specific office in the North American Numbering Plan (NANP). Where blocks of numbers arc assigned to alternate service providers, they would be considered within the NANP and therefore would be routed directly based on the assigned block. Therefore, with each ported number, the terminating exchange must be updated the information that the number is now portable. With the method of the present invention, number portability is implemented by augmenting the existing Directory Number table with a field to indicate the number is portable. In addition, in one embodiment of the invention, a Directory Number (DN) table is further augmented by providing alternate routing options such that a query to an external database, such as an SCP is not required. This is shown in FIGS. 3a and 3b. The DN table of database 30 at the terminating office is provided with a customer profile which includes, amongst others, a directory number field 31 and a portability field 32. This table can of course be an exclusion table, wherein the presence of the dialled DN indicates number portability.

Figure 4:
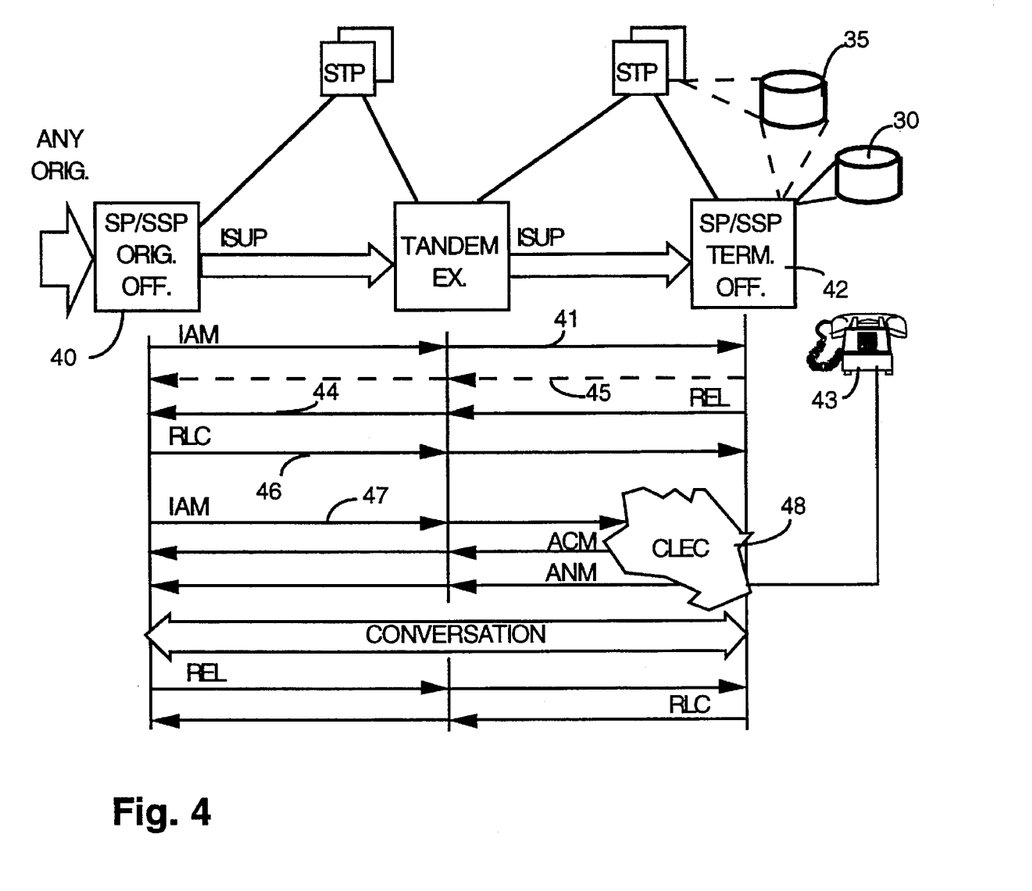
FIGS. 4, 5 and 6 are diagrams illustrating signalling call flow according to the preferred embodiments of the present invention.
Figure 5:
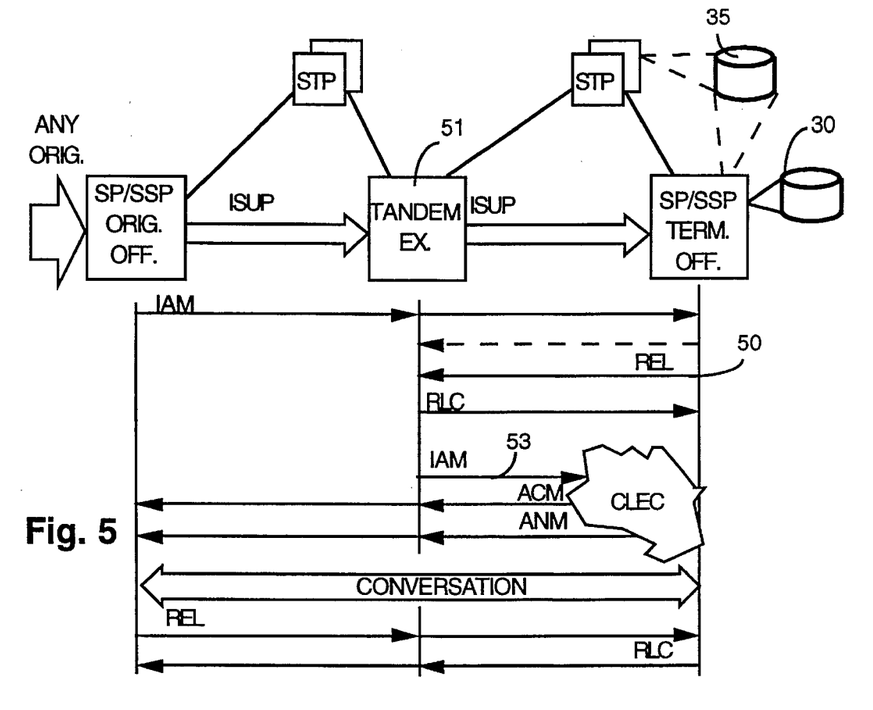

Database 35, shown in FIG. 3b, can either be internal to a switch or external thereof, such as part of an SCP. FIGS. 4 and 5 illustrate this flexibility by means of dashed lines from the database to either the terminating office, if the database tables are internal to the switch, or an STP, in the case of an external database.

Database 35, contains a look up table 36 with telephone numbers which have been identified in table 30, as portable. A routing option field 37 enables the translation of the called number to provide new routing information. The routing information need not refer to a number, but can consist of a trunk and switch identification code, carrier identification code, route advance number, CLEC number, etc.

Thus, with reference to FIGS. 3a, 3b and 4, when the call set up is initiated from an originating office 40 and the IAM 41 is receive, at the terminating office 42, the called party's profile is verified at the DN table of database 30. A determination of whether the called party's number is portable can then be made from the portability field 32 at the terminating office 42. If the called party's number is not portable, the call is routed by terminating office 42 to the called party's station. However, if the portability field 32 of database 30 indicates that the called party's number is portable, a query is launched from the terminating office 42 to an SCP containing database table 35. As indicated, database table 35 can either be resident in the terminating switch 42 or part of an external SCP.

At this point, a modified ISUP REL with cause message 44 is returned from the terminating office 42 to the originating office 40, via a tandem exchange or intermediate office. The modified REL with cause message 44 contains a new parameter which provides/an indication to the originating office 40, or any office which carries the call, that this call is directed to a portable number. Upon determining at the terminating office 142 that the number is portable, an optional parameter message, which can either form part of the release with cause message or be separate, such as shown at dotted line 45, is filled with the routing option, at the terminating office and is sent to the originating switch 40 via any intermediate offices. The optional parameter is filled by obtaining from DN table of database 35, an alternate routing option from routing option field 37. If database 35 is located at an SCP external to terminating office 42, then a TCAP query is launched to the SCP to obtain the new routing option associated with the portable number of field 36. The TCAP query contains the information, such as the called party's number which has been identified as portable. Once the TCAP, query is received at the external database, a translation provides new routing information from field 37. The TCAP response from the external SCP database is inserted or filled in an optional parameter of the release with cause message (example Generic Address Parameter (GAP)), which is forwarded or returned to originating office 40, from where the call originates.

Once REL 44 is received, the originating office 40 sends a release complete message 46 to the terminating switch 42, to clear the call set-up.

A new IAM 47 can then be created and sent to the competitive local exchange carrier (CLEC) shown at reference numeral 48. The IAM message 47 contains the necessary information to enable the call to be routed to it's final destination.

Thus, number portability can be accomplished using a modified ISUP message returned from the terminating office for each number considered to be portable. An example of an ISUP message which can be used is the release with cause indicator. A PAM, TCAP message or any newly defined or modified ISUP or SS7 message capable of carrying information can also be used to accomplish this task.

Although the use of the release with cause message is used in the preferred embodiment of the invention, a message indicative that a dialled number is portable could be accomplished using other ISUP messages or parameters contained in existing ISUP messages.

An example of the release message identification format follows:

| Message Type | Standard & No. | Parameter | Option |
|---|---|---|---|
| Release | ANSI-T1.113.3 Table 14A | Cause Par 3.9 | Normal Event 0011110 (30) |

The new value is only an example and can be any parameter which is not already being used in the existing standard. The new parameter indicates to any offices which carry the call, that this call is a portable number.

Prior to returning a release message, once the terminating office has determined that the number is portable, information can be passed back along the same path that an Address Complete Message (ACM) would follow if dialled station were available to accept calls. The ISUP message could be a new message, use the format of an existing message (Example: Pass-Along-Message), or an existing message capable of passing back the new routing information. Included in these messages is an indication that the number was portable plus the new routing information.

Although certainly not the preferred embodiment, it is also possible to pass the release message prior to the information message. This could be accomplished if a release message with the cause portable, did not tear down the call path until after the information message was passed back.

Many parameters exist which are appropriate to sending back the new routing information, but the most appropriate parameter would be the Generic Address parameter. This parameter exists in both information messages as well as in the release message.

| Generic Address Parameter: Example | | |
|---|---|---|
| Type of Address | Completion Number | 00000100 |
| Odd/Even Indicator | Odd or Even number of digits - Can Vary | 0 Even |
| Nature of Address | This field would be filled with either international or use the spare code which would allow digits in excess of 10 to be filled. This would allow the inclusion of supplementary information to route the call to the parted destination. | 00001012 Spare Today |
| Numbering Plan | Telephony Number Plan | 001 |
| Address Information | Variable depending on numbering scheme | 25-10-613-781-9165 |

Where the 25-10 indicates the network and office to which the call will be redirected.

It should be pointed out that although ISUP messages are returned from the terminating office in order to service portable numbers, a determination is made of whether an adjacent switch can receive the ISUP messages from the terminating office. This determination is done using an internal table located at each switch. This table is commonly called an adjacent node table. Using an adjacent node table, applicable to SS7 signalling, each office can determine, where possible, the release of the call further back in the chain. That is, as the Release message travels back from the terminating office to a previous office along the signalling path from where the call originate, each office will query the adjacent node table before returning the ISUP messages further back along the path. Once the call reaches a point where the call cannot be released further, a new IAM is created to complete the call to a new terminating office associated with the new routing option.

A call scenario, wherein the release message cannot return to the originating office is illustrated in FIG. 5, wherein even though the call originated outside the network, the release message 50 reaches a tandem exchange 51 which is the source of the call in the network. An IAM 53 is then created at that point to enable the call to be completed, with routing information obtained from database 35.

Figure 6:
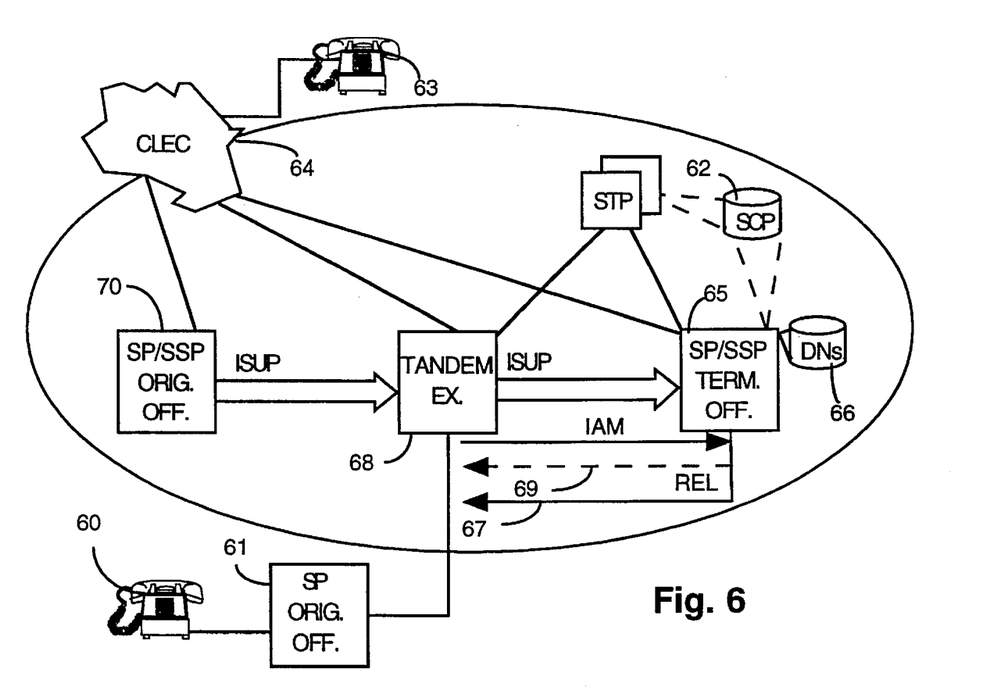

The block diagram of FIG. 6 illustrates a call scenario wherein a calling party 60 is served by a switching office 61 which is unable to support number portability. For example, support for number portability is not available if the switch is an analog exchange or where software is not resident in that exchange to support number portability.

Accordingly, when calling party 60 attempts to reach a called party 63 which is served by a CLEC 64, a call set-up will be initiated between switching office 61 and terminating office 65 where the dialled number is ported. A directory number table 56, such as shown in FIG. 3a, provides an indication of whether the dialled digits are associated with a portable number.

Thus, once the call set-up signalling data reaches tandem exchange 68 from originating office 61, an IAM containing routing information is forwarded to terminating office 65. If the dialled digits point to a portable number in table 66, database 62 is also queried to determine the routing option associated with the portable number. The response from the SCP is incorporated as part of an optional parameter in the release with cause message carrying routing information. In this example, the modified ISUP message is a release with cause message which provides an indication that the number called is portable and, as indicated above, carries the routing option. Again, it should be pointed out that both messages can take other forms, and will depend on the limitations of the ISUP signalling protocols. Then, a modified ISUP message 67 is returned to tandem 68. The modified ISUP message contains an indication that the call is directed to a portable number and also contains the new routing option. As indicated earlier, the new routing option can also be forwarded separately from message 67, for example, using a modified ISUP message 69.

If the call had originated from a calling party served by a switch able to support number portability, i.e. one able to receive the new routing options, such as switch 70, then the ISUP release message 67 would return all the way back to the switching office where the call originated, i.e. switch 70. This call scenario was illustrated with reference to FIG. 4.

However, because switch 61, Which originated the call, cannot receive an make use of ISUP messages containing new routing options, for number portability service, the modified ISUP release message 67 is returned to the closest office along the signalling path from where the call originated, which supports number portability, i.e. tandem switch 68.

Therefore, in the call scenario illustrated in FIG. 6, the office closest to the originating switch, along the signalling route, which is capable of handling number portability is tandem switch 68. The determination of how far back along the signalling path the modified ISUP messages should be returned, is made according to a table, located in each office. This table is often referred to as an adjacent node table. According to this invention, the table provides an indication of which switching node adjacent to it, is capable of supporting number portability. Once a signalling call path as been established, this table would identify if the previous or adjacent office, through which the call was routed, supports number portability services.

Once the mollified ISUP release message 67 is received at tandem exchange 68, a determination is made of whether the modified ISUP message should return further down the signalling path. If no other switches along the path is suitable to support number portability, a new IAM is created at tandem switch 68 to route the call to the called party 63. The new IAM would be created based on routing information received from the optional parameter of release message 67.

Database 62 can exist anywhere and need not be located near the exchange. Further, a database can support one or more exchanges as required.

The table of FIG. 4b can include a unique designation for portable numbers within the incumbent LEC network, portable numbers in a competitive local exchange carrier (CLEC) network and numbers which have moved into another area such as an NPA. The tables need not be identical on each exchange. Thus tables can be updated uniquely and need not be duplicated or replicated across all exchanges by metropolitan area, local area, region, or any other area. This reduces the size of each table which becomes important once portable number penetration is significant. Number ranges will also be an important mechanism for reducing search time and table size.

It will thus be seen from the above description, instead of sending a query to a database to provide number portability, with the method of the present invention, number portability can be provided with the use of modified ISUP messages to provide a new routing option from the terminating office to an originating office to enable a call directed to a portable number to be completed. This solution therefore provides better use of the network's resources and at the same time, reduces the costs associated with providing number portability.

Variations of the particular embodiment herewith described will be obvious to one skilled in the art, and accordingly the embodiment is to be taken as illustrative rather than limitive, the true scope of the invention being set out in the appended claims.

What is claimed is:

1. In a telephone network having a number of telephone switching offices equipped with SSPs (Service Switching Points) operating with IN (Intelligent Network) application software, and a remotely located SCP (Service Control Point) adapted to receive, when required, SS7 (Signalling System 7) messages from the SSPs to translate a dialled number to enable the routing of call on the telephone network, a method of providing number portability for the treatment of calls from a calling party to a specific number of a called party, comprising the steps of:

a) receiving digits dialled by said calling party at an exchange serving said calling party;

b) establishing a call path from said exchange serving said calling party to a terminating office associated with the dialled digits;

c) receiving an Initial Address Message (IAM) at said terminating office and determining whether said call is directed to a portable number;

d) launching a query to a database, if said call is directed to a portable number to obtain a routing option to enable said call to be routed to said called party;

e) creating at said terminating office, a modified Integrated Services Digital Network (ISDN) User Part (ISUP) message containing an indication that the called party number is a portable number and incorporating a new routing option, if said call is directed to a portable number;

f) determining whether an intermediate switching office along the signalling path is capable of supporting number portability, if said exchange serving said calling party is unable to support number portability;

g) sending said modified ISUP message from said terminating office to said intermediate switching office along said call path, if said exchange is unable to service the call;

h) receiving said routing option at said intermediate switching office; and i) creating a new IAM to enable the call to reach the called party.

2. A method as defined in claim 1, wherein said call is determined to be directed to a portable number by accessing the called party's profile at an internal database at said terminating office.

3. A method as defined in claim 2, wherein said modified ISUP message is a release with cause message.

4. A method as defined in claim 2, wherein said modified ISUP message comprises a pass along message for carrying said new routing option, which is followed by a release with cause message.

5. A method as defined in claim 3, wherein said release with cause message includes a parameter containing said new routing option.

6. A method as defined in claim 5, wherein said parameter comprises a Generic Address Parameter (GAP) for carrying said new routing option.

7. A method as defined in claim 1, wherein said database is resident in said terminating office.

8. A method as defined in claim 1, wherein said database forms part of an SCP which is queried from said terminating office using a Transaction Capabilities Application Part (TCAP) message.

9. A method a defined in claim 1, wherein a determination of whether said exchange or said intermediate switching office along the call path is capable of supporting number portability is made by querying a database table resident in said intermediate switching office along the call path, as the modified ISUP messages are returned along the path.

10. In a telephone network having a number of telephone switching offices equipped with SSPs (Service Switching Points) operating with IN (Intelligent Network) application software, and a remotely located SCP (Service Control Point) adapted to receive, when required, SS7 (Signalling System 7) messages from the SSPs to translate a dialled number to enable the routing of a call on the telephone network, a system for providing number portability for the treatment of calls from a calling party to a specific number of a called party, comprising:

a) a first switching office for receiving digits dialled by said calling party;

b) a second switching office connected to said first switching office via a call path established for routing a call associated with the dialled digits, said second switching office receiving an Initial Address Message (IAM);

c) first database means, at said second switching office for determining whether said call is directed to a portable number;

d) second database means for receiving a query from said second switching office if said called party number is a portable number, and for translating said called party number to new routing information;

e) means at said second switching office for creating a modified Integrated Services Digital Network (ISDN) User Part (ISUP) message containing an indication that the called party number is a portable number, if said call is directed to a portable number, said modified ISUP message containing said new routing information; and f) third database means at said second switching office for determining whether an intermediate switching office along the call path is capable of supporting number portability, wherein said modified ISUP message is sent from said second switching office to said intermediate switching office along said signalling path, if said first switching office is unable to service the call, such that when said new routing information is received at said intermediate switching office, a new IAM can be forwarded to an alternate terminating office associated with said new routing information.

11. A system as defined in claim 10, wherein said modified ISUP message i s a release with cause message having an optional parameter for carrying an alternate routing option to switching offices along said signalling path.

12. A system as defined in claim 10, wherein said modified ISUP message comprises a pass along message for carrying said new routing option, which is followed by a release with cause message.

13. A method as defined in claim 11, wherein said parameter comprises a Generic Address Parameter (GAP) for carrying said new routing option.

* * * * *